(12) United States Patent
Kleber

(10) Patent No.: US 7,726,542 B2
(45) Date of Patent: Jun. 1, 2010

(54) FRICTION-WELDED ASSEMBLY WITH INTERLOCKING FEATURE AND METHOD FOR FORMING THE ASSEMBLY

(75) Inventor: Richard M. Kleber, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/145,650

(22) Filed: Jun. 25, 2008

(65) Prior Publication Data

US 2009/0324986 A1    Dec. 31, 2009

(51) Int. Cl.
B23K 20/12    (2006.01)
B29C 65/06    (2006.01)

(52) U.S. Cl. .................. 228/112.1; 228/114.5; 156/73.5
(58) Field of Classification Search ........................ None
See application file for complete search history.

(56) References Cited

U.S. PATENT DOCUMENTS

| | | | | |
|---|---|---|---|---|
| 3,144,710 A | * | 8/1964 | Camps-Campins et al. | 228/114.5 |
| 3,269,003 A | * | 8/1966 | Hollander et al. | 228/114.5 |
| 3,417,457 A | * | 12/1968 | Burke et al. | 228/114.5 |
| 4,817,852 A | * | 4/1989 | Hill | 228/114 |
| 4,832,769 A | * | 5/1989 | Shantz et al. | 156/73.5 |
| 4,944,977 A | * | 7/1990 | Shantz et al. | 428/36.92 |
| 5,154,340 A | * | 10/1992 | Peacock | 228/114.5 |
| 5,167,310 A | * | 12/1992 | Fischer et al. | 192/113.5 |
| 5,211,100 A | * | 5/1993 | Fuller et al. | 92/169.1 |
| 5,469,617 A | * | 11/1995 | Thomas et al. | 29/889.21 |
| 5,495,977 A | * | 3/1996 | Hildebrandt et al. | 228/112.1 |
| 6,660,407 B1 | * | 12/2003 | Bender et al. | 428/615 |
| 6,767,071 B2 | * | 7/2004 | Cai | 301/132 |
| 2005/0274259 A1 | * | 12/2005 | Young et al. | 96/108 |
| 2006/0000875 A1 | * | 1/2006 | Kyriakoglou | 228/159 |

\* cited by examiner

*Primary Examiner*—Kiley Stoner
(74) *Attorney, Agent, or Firm*—Quinn Law Group, PLLC

(57) ABSTRACT

A welded assembly includes a weld joint formed via a spin-welding process. A disc receives a cylinder prior to spin-welding, with the disc having a circumferential groove undercutting or defining an annular shelf. An interlocking feature retaining the cylinder and disc is formed between a flow pattern of the cylinder and the annular shelf upon cooling of molten flash in the groove underneath the annular shelf. Teeth can be formed integrally with the disc to provide a torsional interlocking feature between the disc and cylinder. A method for forming a weld joint between a plastic cylinder and disc includes providing the disc with a circumferential groove forming an annular shelf, and rotating the cylinder with respect to the disc under an axial force to thereby form an outflow of molten flash. The flash forms an interlocking feature when cooled after flowing into the groove underneath the shelf.

7 Claims, 2 Drawing Sheets

US 7,726,542 B2

FRICTION-WELDED ASSEMBLY WITH INTERLOCKING FEATURE AND METHOD FOR FORMING THE ASSEMBLY

TECHNICAL FIELD

The present invention relates to an optimized friction-welding method and assembly.

BACKGROUND OF THE INVENTION

In a friction-welding process, such as conventional spin-welding process, the components to be welded or fused are placed adjacently to each other and then rotated at a high relative rate of speed in conjunction with an applied axial clamping force. The frictional heating generated at or along a boundary or interface between the components melts a portion of the material, typically plastic or metal, which then flows away from the interface or the "weld zone" in molten form, hereinafter referred to as "molten flash". When the molten flash cools, a homogenous weld joint is formed at or along the weld zone from the now intermixed materials of the welded components.

Spin-welding provides many advantages, such as relatively short cycle times, large batch sizes, and high overall process efficiency. Spin-welding also provides excellent repeatability when used in conjunction with precise process control methods, i.e., controlled material feed and/or spin rates, axial pressures, applied stroke, etc. However, the bonding strength and long term durability of a weld joint formed via a conventional spin-welding process may be less than optimal when used in conjunction with certain applications, and therefore the spin-welding process is generally restricted or limited to welding relatively small cylindrical parts of similar or like material in order to maximize the strength of the resultant weld joint.

SUMMARY OF THE INVENTION

Accordingly, a welded assembly is provided having a weld joint which is formed between a pair of adjacent components via a spin-welding process, as explained above. In addition to a conventional weld joint at or along the interface between the components, the welded assembly also has an interlocking feature formed between the components. The interlocking feature retains the components independently of the weld joint, and is formed by movement of the molten flash in a predetermined manner during the spin-welding process. In one embodiment, the components to be welded include a substantially cylindrical component or a cylinder, and a disc-shaped component or a disc. The disc has a circular opening which is specially sized, shaped, and/or adapted for receiving the cylinder prior to commencement of the spin-welding process. The disc has a circumferential undercut or groove forming an annular shelf.

When one of the components is rotated with respect to the other in the presence of an applied axial force, the components melt at or around the weld zone or interface, with molten flash flowing away from the weld zone and underneath the annular shelf. When the molten flash ultimately cools in the form of a flow pattern, a first interlocking feature is formed between the annular shelf and the flow pattern. The interlocking feature retains the components in at least one direction, thus optimizing the overall strength and/or durability of the welded assembly.

In particular, the first interlocking feature retains the components along the axial direction, and does so independently of the status or integrity of the weld joint itself. To provide another interlocking feature, and in particular an interlocking feature providing a torsional interlocking capability between the components, the disc can include a plurality of inwardly-projecting splines or teeth. The molten flash moves into enveloping contact with the teeth prior to cooling, thus preventing relative rotation of the welded components of the assembly. The welded assembly can be made of metal, such as aluminum alloy and cast iron, for use as a brake rotor, or of thermoplastics for use in various applications, such as a liquid or gaseous fluid coupling in a vehicle, etc.

A method for forming a weld joint between a cylinder and a disc using a spin-welding process includes providing the disc with a circumferential undercut or groove forming an annular shelf, then rotating the cylinder with respect to the disc under a first axial compressive force during the spin-welding process. An outflow of molten flash is formed, which moves at least partially into the groove and under the annular shelf. The molten flash is then cooled to form a flow pattern, thus providing a first interlocking feature between the annular shelf of the disc and the flow pattern, which is suitable for preventing axial motion of the cylinder with respect to the disc independently of the weld joint.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
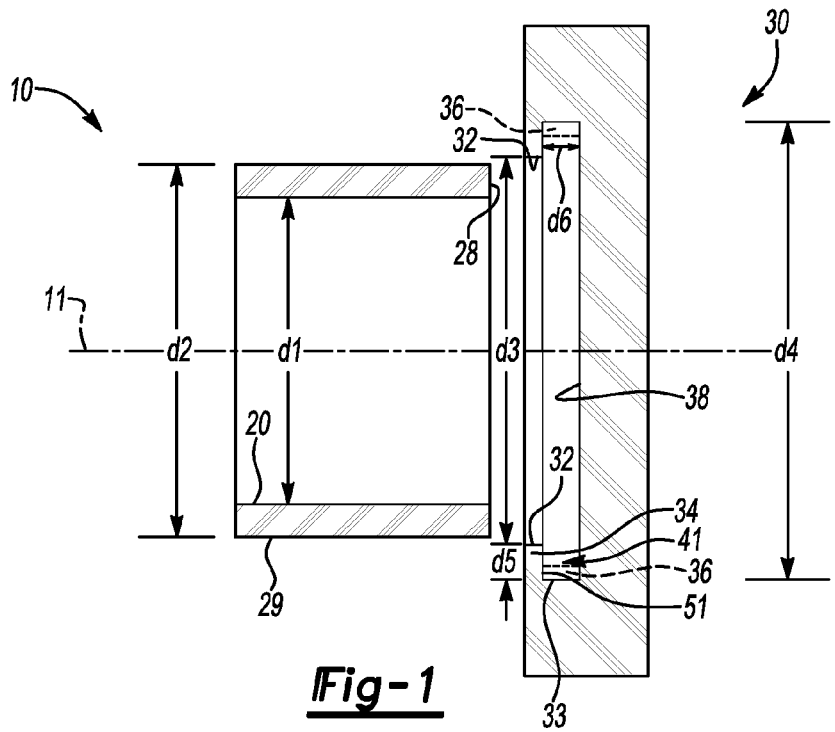
FIG. 1 is a cutaway side view of a representative pair of components prior to mutual bonding via a friction-welding or a spin-welding process.

Referring to the drawings wherein like reference numbers represent like components throughout the several figures, and beginning with FIG. 1, a first component 10 and a second component 30 are shown as they appear prior to being subjected to a friction-welding or a spin-welding process in accordance with the invention, as will be described below. The first component 10 is shown in one embodiment as a tube or a cylinder, and the second component 30 is shown as a disc. As such a configuration is most typically used during a conventional spin-welding process, for simplicity the first and second components will be referred to respectively hereinafter as the cylinder 10 and the disc 30.

In one embodiment, the cylinder 10 and disc 30 are each constructed of the same or different types of suitable metal, such as an aluminum alloy, cast iron, or another suitable metal material. In another embodiment, the cylinder 10 and the disc 30 are each constructed of the same or different types of a thermoplastic polymer having a relatively high molecular weight, and which becomes soft and ultimately molten and easily welded when a sufficient level of heat is applied. Those of ordinary skill in the art will recognize that other metal, plastic, and/or composite materials that respond in an acceptable manner to spin-welding can also be used within the scope of the invention.

The cylinder 10 and the disc 30 share a common axis 11. The cylinder 10 has an inner surface 20 defining an opening or diameter d1, an outer surface 29 having a diameter d2, and a weldable surface 28. Likewise, the disc 30 has a floor 38, a first inner wall or surface 32 defining an opening having a diameter d3, and a second inner wall or surface 33 having a diameter d4. The diameter d3 of the disc 30 is slightly larger than the diameter d2 of the cylinder 10 in order to allow the cylinder 10 to pass through the diameter d3 of the disc 30 without touching the first inner surface 32.

A circumferential undercut, cavity, or groove 41 is formed or provided within the surface 32 of the disc 30, with the groove 41 undercutting the surface 32 by a radial distance d5 to thereby form an annular shelf 34. The groove 41 has an axial distance d6, with the radial distance d5 being the distance as measured between the first inner surface 32 and the second inner surface 33. An optional plurality of splines or teeth 36 (also see FIG. 4) can extend in a radially-inward from the second inner surface 33 toward the first inner surface 32 within the groove 41, with a torsion interlocking capability of the teeth 36 described in more detail below with reference to FIGS. 3 and 4.

Figure 2:
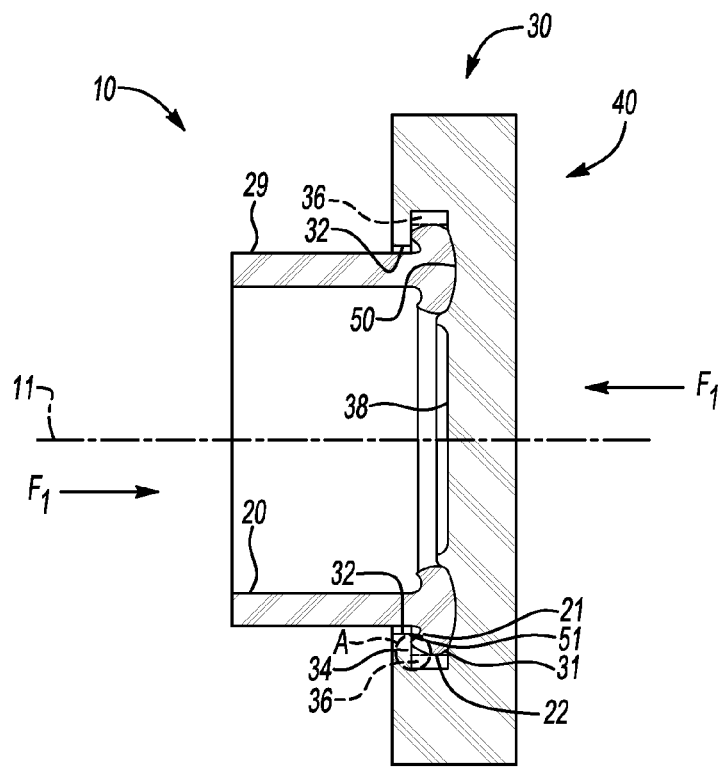
FIG. 2 is a cutaway side view of the components of FIG. 1 according to one embodiment.

Referring to FIG. 2, prior to commencement of the spin-welding process, the surface 28 (see FIG. 1) of the cylinder 10 is moved into contact with the floor 38 of the disc 30. A first axial force is then applied to the cylinder 10 and the disc 30, as represented by the opposing arrows $F_1$, while one or both of the cylinder 10 and the disc 30 are rotated or spun at a relatively high rate of speed. That is, one of the cylinder 10 and the disc 30 can be rotated while the other is held stationary. Alternately, the cylinder 10 can be rotated in one direction while the disc 30 is rotated in another direction to maximize a speed differential therebetween. The materials of the cylinder 10 and the disc 30 melt along their boundary or interface to form a weld joint 50 upon cooling, thus producing a welded assembly 40.

When the localized temperature of the cylinder 10 and the disc 30, i.e., the temperature at or along the weld joint 50 being formed, approaches the melting point of the materials of construction of the cylinder 10 and the disc 30, the relative rotation of the cylinder 10 and the disc 30 is abruptly stopped while the first axial force $F_1$ is maintained. The molten flash rapidly cools to form a singular or homogenous structure, as will be understood by those of ordinary skill in the art of spin-welding. However, prior to solidifying, the molten flash is moved or admitted into the groove 41 by its relatively low viscosity and the first axial force $F_1$, i.e., the molten flash flows underneath the annular shelf 34 as shown by the flow pattern 21 in FIG. 2.

Upon cooling, the flow pattern 21 of the cylinder 10 and an adjoining plastic flow pattern 31 of the disc 30 result. In this manner, a first interlocking feature, represented generally by the area A, is formed between the flow pattern 21 of the cylinder 10 and the annular shelf 34, thus retaining the cylinder 10 with respect to the disc 30, and vice versa. That is, axial retention is provided by the first interlocking feature (area A) independently of the integrity, strength, or status of the weld joint 50. Should the weld joint 50 break or fail under an applied load or stress to the assembly 40, the cylinder 10 and the disc 30 remain mutually connected or attached in an axial direction via the first interlocking feature (area A). As the molten flash is also moved into contact with an underside or a lower surface 51 of the annular shelf 34, a secondary weld joint is effectively formed adjacent to the annular shelf 34 at or along the lower surface 51.

As shown in FIG. 2, the flow pattern 21 has a first or initial outside surface 22 corresponding to an expected maximum diametric flow range under the axial force $F_1$. The position of the initial outside surface 22 can be selected and controlled to provide sufficient radial overlap with the annular shelf 34 to enable an interlocking relationship therewith. Shown in phantom are the optional teeth 36 (also see FIG. 4) which are briefly described above. The torsional interlocking functionality provided by the teeth 36 will now be described with reference to FIGS. 3 and 4.

Figure 3:
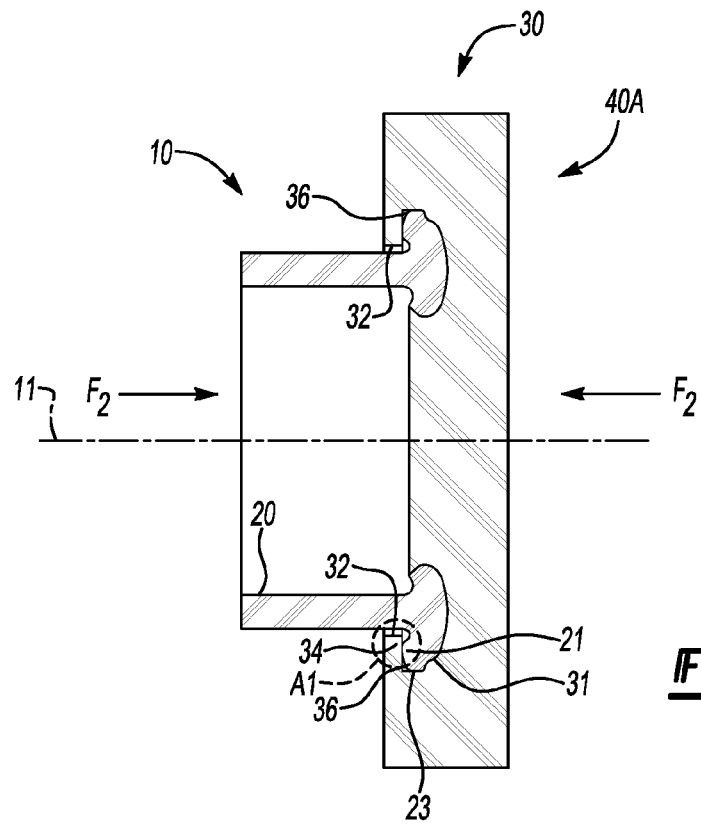
FIG. 3 is a cutaway side view of the components of FIG. 1 according to another embodiment.

Referring to FIG. 3, the assembly 40 of FIG. 2 is shown in another embodiment as the assembly 40A, shown as a representative brake rotor. In one embodiment, the cylinder 10 is constructed of aluminum alloy, while the disc 30 is constructed of cast iron, although other materials or combinations of materials may also be used within the scope of the invention. The assembly 40A utilizes the teeth 36 and a secondary axial compressive force $F_2$ to provide a second interlocking feature, represented generally by the area A1, for minimizing or preventing relative rotation of the cylinder 10 with respect to the disc 30, and vice versa. As shown in FIG. 2, the crest of the flow pattern 21 contacts the lower surface 51 of the annular shelf 34, but its initial outside surface 22 has not quite contacted the teeth 36.

In the assembly 40A of FIG. 3, at the instant relative rotation of the cylinder 10 and the disc 30 is abruptly stopped, the first axial force $F_1$ of FIG. 2 is rapidly increased, thus resulting in the second axial force $F_2$. The second axial force $F_2$ causes additional plastic outflow or an increase in the diameter associated with the initial outside surface 22 to thereby produce a flow pattern 21 having a final outside surface 23 which is larger than the diameter of the initial outside surface 22. As a result, the teeth 36 are at least partially contacted by, and can be completely enveloped or engulfed by, the additional plastic outflow. By adjusting the level of second axial force $F_2$, the desired amount of envelopment or contact with the teeth 36 can be achieved. In this manner, a second interlocking feature (area A1) is formed between the flow pattern 21 and the teeth 36 which provides a torsional interlock, thereby minimizing or preventing relative rotation of the cylinder 10 and the disc 30.

Figure 4:
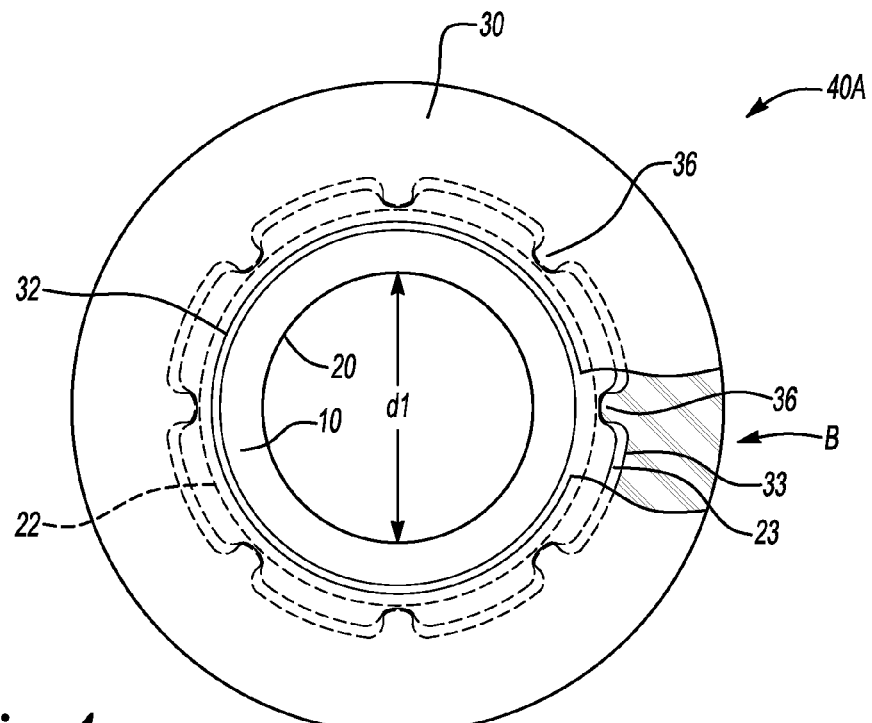
FIG. 4 is a plan view of the welded components of FIGS. 2 and 3.

Referring to FIG. 4, a top view of the assembly 40A of FIG. 3 is shown after the application of the second axial force $F_2$. A portion or section of the top-most layer of the disc 30 has been cut away just below the level of the annular shelf 34, as indicated generally by the arrow B, in order to reveal the spatial relationship between the teeth 36 and the final outside surface 23, or a representative amount of envelopment of the teeth 36 by the additional plastic outflow caused by the second axial force $F_2$. Also shown in the initial outside surface 22, which is used when the teeth 36 are not required or when the teeth 36 are not present in the disc 30.

While the best modes for carrying out the invention have been described in detail, those familiar with the art to which this invention relates will recognize various alternative designs and embodiments for practicing the invention within the scope of the appended claims.

The invention claimed is:

1. A method for welding a cylinder and a disc using a spin-welding process, the method comprising:

providing the disc with a circumferential groove forming an annular shelf, and with a plurality of inwardly-projecting teeth;

rotating the cylinder with respect to the disc under a first axial force during the spin-welding process to thereby form molten flash;

moving the molten flash underneath the annular shelf and at least partially into the circumferential groove, including moving the molten flash into enveloping contact with the teeth; and cooling the molten flash to thereby form a weld joint between the cylinder and the disc, and to thereby form a flow pattern;

wherein the flow pattern forms a first and a second interlocking feature between the annular shelf of the disc and the cylinder, the first interlocking feature being suitable for preventing axial motion of the cylinder with respect to the disc independently of the weld joint, and the second locking feature preventing a relative rotation of the cylinder with respect to the disc.

2. The method of claim 1, wherein moving the molten flash into enveloping contact with the teeth includes:

stopping the rotating of the cylinder with respect to the disc; and applying a second axial force that is sufficiently greater than the first axial force for moving the molten flash into the enveloping contact with the teeth.

3. The method of claim 1, wherein rotating the cylinder with respect to the disc includes rotating the cylinder in one direction and rotating the disc in another direction to thereby maximize a speed differential between the cylinder and the disc.

4. The method of claim 1, further comprising:

rotating the cylinder with respect to the disc under the first axial force during the spin-welding process such that the molten flash moves into contact with a surface of the annular shelf; and cooling the molten flash to thereby form a secondary weld joint adjacent to the annular shelf.

5. A method for forming a first and a second interlocking feature for retaining a first component with respect to a second component using a spin-welding process, the method comprising:

providing the first component with an opening and a circumferential groove defining an annular shelf, and with a plurality of inwardly-projecting teeth disposed within the circumferential groove;

inserting the second component into the opening of the first component;

applying a first axial compressive force to the first and second components;

rotating one of the first and the second components with respect to the other while the first axial compressive force is being applied to thereby form an outflow of molten flash;

admitting the outflow of molten flash at least partially into the circumferential groove and underneath the annular shelf, and into enveloping contact with the teeth; and cooling the molten flash to thereby form a flow pattern, the flow pattern providing as the first interlocking feature a feature which prevents axial motion of the first component with respect to the second component, and providing as the second interlocking feature a feature which prevents a relative rotation of the first component with respect to the second component.

6. The method of claim 5, wherein admitting the outflow of molten flash at least partially into the circumferential groove includes applying a second axial compressive force to thereby force the molten flash into the circumferential groove.

7. The method of claim 6, wherein the first component is constructed of an aluminum alloy and the second component is constructed of cast iron.

* * * * *